United States Patent [19]

Nojima et al.

[11] Patent Number: 5,073,311
[45] Date of Patent: Dec. 17, 1991

[54] MULTIPLE-GAS-PHASE LIQUID TREATMENT APPARATUS

[75] Inventors: Youko Nojima; Hisatake Nojima, both of Kagoshima, Japan

[73] Assignee: Yuugen Kaisha Parasight, Chiba, Japan

[21] Appl. No.: 566,459

[22] PCT Filed: Apr. 19, 1989

[86] PCT No.: PCT/JP89/00416
§ 371 Date: Aug. 16, 1990
§ 102(e) Date: Aug. 16, 1990

[87] PCT Pub. No.: WO89/10183
PCT Pub. Date: Nov. 2, 1989

[30] Foreign Application Priority Data

Apr. 21, 1988 [JP] Japan ................... 63-98776

[51] Int. Cl.$^5$ .................................. B01F 3/04
[52] U.S. Cl. ........................ 261/93; 261/108; 261/113; 261/114.1
[58] Field of Search ............ 261/108, 113, 114.1, 261/93

[56] References Cited

U.S. PATENT DOCUMENTS

| | | | |
|---|---|---|---|
| 169,970 | 11/1875 | Deymann et al. | 261/114.1 |
| 344,322 | 6/1886 | Lunge | 261/113 |
| 2,106,366 | 1/1938 | Tijmstra | 261/113 |
| 2,153,570 | 4/1939 | Mann, Jr. | 261/108 |
| 2,515,090 | 7/1950 | Linder | 261/113 |
| 2,672,330 | 3/1954 | Swenson | 261/114.1 |
| 2,727,882 | 12/1955 | Vodonik | 261/114.1 |
| 3,421,335 | 1/1969 | Becker | 261/113 |
| 4,310,475 | 1/1982 | Leva | 261/113 |

FOREIGN PATENT DOCUMENTS 38-2955 4/1963 Japan .
48-69 1/1973 Japan .

Primary Examiner—Tim Miles
Attorney, Agent, or Firm—Jordan and Hamburg

[57] ABSTRACT

A multiple-gas-phase liquid treatment apparatus for use, for example, as a gas dissolving apparatus, gas removing apparatus, sewage treatment apparatus, or large-quantity culture apparatus includes a hollow container, a plurality of horizontal partition plates mounted in the hollow container to define a plurality of vertically-stacked liquid treatment chambers, a pouring port for introducing liquid to be treated into an upper portion of the hollow container, a discharge port for removing treated liquid from a bottom portion of the hollow container, a gas vent port for introducing gas into the bottom portion of the hollow container, and a hollow tube connected to each horizontal partition plate and extending a predetermined distance downwardly therefrom. Liquid introduced into the top portion of the hollow container flows from one partition plate to an adjacent lower partition plate through the hollow tube in each partition plate. The movement of the liquid created by this arrangement increases the contact surface area between the liquid and the gas introduced into the hollow container, thus increasing gas dissolution in or removal from the liquid. The effect can be further increased by providing stirrers in each liquid treatment chamber mounted on a rotor shaft driven by a motor.

2 Claims, 1 Drawing Sheet

5,073,311

MULTIPLE-GAS-PHASE LIQUID TREATMENT APPARATUS

BACKGROUND OF THE INVENTION

It is important in breeding of aquatic life to quickly supply oxygen required for breathing in a breeding liquid and to quickly remove unnecessary carbon acid gas from the breeding liquid. Such dissolving of the gas into the liquid or removal (evaporation) of the gas from the liquid relies upon the size of the contact surface area between the gas and the liquid. If the contact surface area is constant, movement of ht liquid, that is, stirring of the liquid increases the contact surface area, so that dissolving or evaporation quickly occurs. The invention is directed to stagnate or accumulate the gas into the liquid in a plurality of separated manners thereby increasing the contact surface area between the gas and the liquid in a three-dimensional manner and, further, to stir the liquid by a motor located centrally thereby rapidly increasing the contact effect.

SUMMARY OF THE INVENTION

It is considered that conditions, under which a gas is dissolved in a liquid, include 1) the kind of the gas, 2) a partial pressure of the gas in the atmosphere, 3) the kind of the liquid, 4) a partial pressure of the gas in the liquid, 5) temperature, 6) air pressure, 7) a contact surface area between the gas and the liquid, and the like.

Whether the gas is dissolved in the liquid or is removed from the liquid is determined by the relationship between a partial pressure of the gas in the atmosphere containing the gas and a partial pressure of the gas (dissolved) in the liquid. That is, if the pressure of the gas in the atmosphere is higher than the partial pressure in the liquid, the gas is dissolved in the liquid and, conversely, if the partial pressure of the gas in the atmosphere is lower than the partial pressure in the liquid, the gas is removed from the liquid. The invention utilizes this physical phenomenon to efficiently dissolve or remove the gas into or from the liquid by moving the liquid more than the gas to increase the contact surface area between the gas and the liquid.

The aspect, in which gas is dissolved in water, will be described using oxygen as an example. Oxygen in a gas is quickly dissolved in a surface of the water due to a diffusion phenomenon (this phenomenon is also diffusion), but the dissolved oxygen is diffused in the water extremely slowly. That is, only 0.0001 second or 0.01 second will be required for diffusion of distances over 1 micron or 10 microns, respectively. If the distances become 1 mm and 1 cm, however, 100 seconds and 3 hours are required, respectively. A stream or flow of the water plays an important role in transmitting oxygen to water which is not in contact with the oxygen, so that the dissolving phenomenon due to the above-described increase in the contact surface area is explained from another angle theoretically.

A microorganism decomposes organic matter under the separated and accumulated gas phase for the purpose of hyperplasia of the microorganism per se under aerobic conditions in the gas phase. The decomposing speed is the same as the breeding speed of the microorganism. This means that, if the microorganism is in contact with sewage having organic matter with the number of individuals to such an extent as to utilize (decompose) a give quantity of organic matters by a single cell division, it is possible to treat the sewage for 20 to 30 minutes. The effect of the oxygen supply in the invention will now be described. Since oxygen starvation can be avoided in a three-dimensional manner, that is, since air is accumulated in a multiple stage manner to increase the contact surface area between the oxygen and the water infinitely, it is possible to cope with the oxygen demand of a plethora of microorganisms to an extent near the infinite, theoretically. If stirring due to a motor is added, an effect the same as increasing the contact surface area occurs so that the oxygen is rapidly supplied. Thus, carbonic acid gas is quickly removed.

BRIEF DESCRIPTION OF THE DRAWINGS

The invention will be better understood by reference to the accompanying drawings, in which.

DESCRIPTION OF THE PREFERRED EMBODIMENTS

Figure 1:
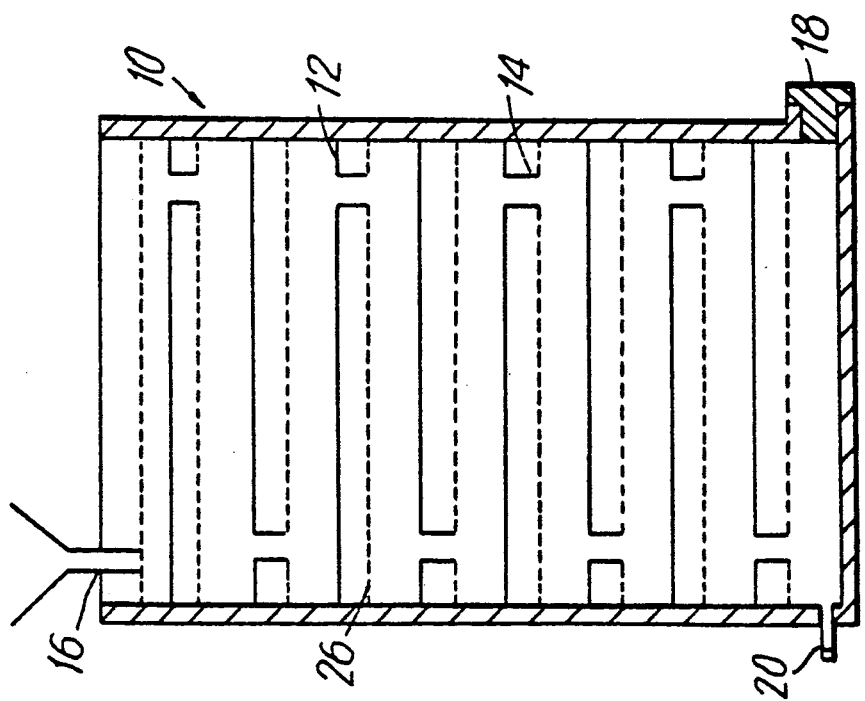
FIG. 1 is a vertical cross-sectional view of one embodiment of the multiple-gas-phase liquid treatment apparatus in accordance with the invention.

As shown in FIG. 1, a plurality of partition plates 12 are horizontally mounted at constant intervals in a container 10 and, further, a single hollow tube 14 is attached to each of the plates 12 so as to project downwardly. Tubes 14 are arranged in staggered relation to each other at positions adjacent opposite side walls of the container. The container 10 has a pouring port 16 through which breeding water enters, a water discharge port 18 through which treated water is taken out, and a vent port 20 through which oxygen or the like is delivered.

Figure 2:
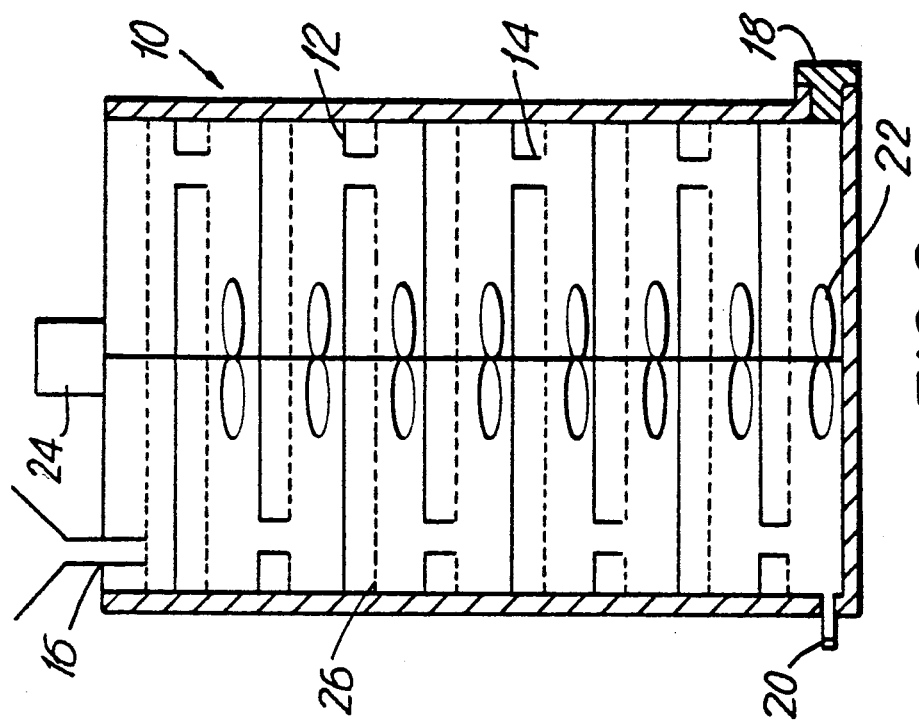
FIG. 2 is a vertical cross-sectional view of a modification of the apparatus shown in FIG. 1.

FIG. 2 is a vertical cross-sectional view in which a plurality of rotary stirring bars 22 powered by a motor 24 are installed in FIG. 1, to cause the effect of increasing the contact surface area between gas and liquid.

FIGS. 1 and 2, if the water discharge port 18 is closed, if water is poured through the water pouring port 16 and is accumulated, and if gas is introduced through the below vent port 20, the gas is accumulated correspondingly to the height of the tube 14. The surplus gas ascends through the tube 14 and is again accumulated at the upper partition plate 12. Here, if the water discharge port 18 is open and if the water is poured through the water pouring 16, the water descends through the tubes 14, and the gas ascends through the same tubes 14.

The height of each of the tubes 14 prescribes the quantity of the gas phase. It is sufficient that a single tube 14 is provided on a single partition plate 12. The tube 14 has a cross-sectional area which should be large when the quantity of flowing water becomes large, or the number of the tubes 14 should increase if the quantity of flowing water becomes large. In the case where a plurality of vertical partitions (not shown) are provided on each partition plate 12 to divide the gas phase, the number of tubes 14 (the height of each of the tubes is shorter than that of each of the vertical partitions (not shown) is required to correspond to the number of the divided gas phases.

In FIG. 1, breeding water flows in a natural fall while being in contact with gas such as oxygen or the like at an artificial water surface 26 in the course of the falling down. Since the contact surface area increases in a three-dimensional manner, the oxygen or the like increases in chance of dissolving. In the case where the oxygen is vented from below, the breeding water is initially in contact with the exhaust gas, but the breeding water is in contact with fresh oxygen immediately before coming out of the apparatus as treated water. This becomes opposed flow and is reasonable.

In FIG. 2, when the water flows in through the above water pouring port 16 and is taken out through the water discharge port 18, the gas enters through the below vent port 20 and, further, the water is stirred. Thus, it is possible for the apparatus to obtain water in which the gas is rapidly dissolved well. The number of the stirring bars 22 and motors 24 increases depending upon the scale and configuration of the apparatus.

In FIGS. 1 and 2, if a mixture of sewage and activated sludge is poured in place of the breeding water, and if air or oxygen enters from below the apparatus, the gas phase is accumulated below each plate 12, and the organic matter in the sewage is decomposed for a short period of time under a condition rich in oxygen. Thus, it is possible to obtain from the apparatus sludge water containing low organic matter as treated water.

According to the present invention, a multiple-gas-phase liquid treatment apparatus is provided which is low in cost and which dissolves and supplies gas in an immediate effect manner or which removes gas in an immediate effect manner. In the case of the use of oxygen, it is possible to continuously supply breeding water which is useful in breeding of all aquatic life.

If a culture liquid is substituted for the sewage, and if a useful microorganism is substituted for the activated sludge, a large-quantity continuous culture is made possible easily in the apparatus.

If a sugar liquid is substituted for the sewage and if useful yeast is substituted for the activated sludge, it is possible to obtain fermentation products such as alcoholic drink, beer, low-class distilled spirits, vinegar or the like in the apparatus. In this connection, in consideration of a period using oxygen as the gas and a subsequent period of anaerobic fermentation using no oxygen as the gas, it is required to vary the kind of gases to effect control. It is also possible to treat the culture liquid in the present apparatus and to cultivate the culture liquid in another tank.

In any event, for any rate of gas used in the invention, it can easily be understood to enable the gas to be dissolved in the liquid to the extent of saturation in a moment. Conversely, the invention can be operated in an atmosphere in which a gas in not contained, to evaporate and remove the gas which is dissolved in the liquid. Thus, application is very wide.

We claim:

1. A multiple-gas-phase-liquid treatment apparatus comprising a container means having a hollow interior including a top portion, a bottom portion and opposed side walls interconnecting said top and bottom portions; a plurality of horizontal partition plates mounted in said hollow interior to define a plurality of vertically-stacked liquid-treatment chambers; pouring port means connected to said container means for introducing liquid into the top portion of said hollow interior and onto a top one of said partition plates, discharge port means connected to said container means for discharging treated liquid from the bottom portion of said hollow interior, vent port means for introducing gas into the bottom portion of said hollow interior, and hollow tube means comprising a hollow tube connected to each horizontal partition plate and projecting downwardly a predetermined distance from said horizontal partition plate into an adjacent lower liquid treatment chamber, said hollow tubes being connected to said horizontal partition plates in staggered relation to each other at positions adjacent said opposed side walls of said container, whereby liquid introduced into the top portion of said hollow interior flows from one partition plate to an adjacent lower partition plate through said hollow tube means, liquid in one liquid treatment chamber flowing through the hollow tube of its respective horizontal partition plate onto a horizontal partition plate of an adjacent lower liquid treatment chamber, while gas introduced into the bottom portion of said hollow interior accumulates beneath said horizontal partition plates to a height equal to said predetermined distance, excess gas ascending through said hollow tubes.

2. An apparatus as in claim 1 further comprising mechanical agitation means for agitating liquid in each of said vertically-stacked liquid treatment chambers, wherein said mechanical agitation means comprises a rotor shaft extending from the top portion of said hollow interior through said plurality of horizontal partition plates and to said bottom portion of said hollow interior, a plurality of stirrers, each of said stirrers being connected to said rotor shaft in one of said liquid treatment chambers, and motor means mounted on said container means for rotating said rotor shaft.

* * * * *